(12) United States Patent
Hitzler et al.

(10) Patent No.: US 11,363,937 B2
(45) Date of Patent: Jun. 21, 2022

(54) CONTROL OF A HOUSEHOLD APPLIANCE

(71) Applicant: BSH HAUSGERAETE GMBH, Munich (DE)

(72) Inventors: Daniel Hitzler, Dillingen (DE); Juergen Klein, Biberbach (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/466,703

(22) PCT Filed: Dec. 1, 2017

(86) PCT No.: PCT/EP2017/081226
§ 371 (c)(1),
(2) Date: Jun. 5, 2019

(87) PCT Pub. No.: WO2018/108580
PCT Pub. Date: Jun. 21, 2018

(65) Prior Publication Data
US 2019/0302718 A1    Oct. 3, 2019

(30) Foreign Application Priority Data

Dec. 16, 2016    (DE) .................... 10 2016 225 274.7

(51) Int. Cl.
| | |
|---|---|
| *A47L 15/46* | (2006.01) |
| *A47L 15/00* | (2006.01) |
| *G05B 19/042* | (2006.01) |
| *G06K 7/14* | (2006.01) |
| *D06F 33/32* | (2020.01) |
| *D06F 103/16* | (2020.01) |

(Continued)

(52) U.S. Cl.
CPC .......... *A47L 15/46* (2013.01); *A47L 15/0063* (2013.01); *D06F 33/32* (2020.02); *G05B 19/042* (2013.01); *G06K 7/1417* (2013.01); *D06F 33/47* (2020.02); *D06F 34/05* (2020.02); *D06F 2101/00* (2020.02); *D06F 2103/16* (2020.02); *G05B 2219/23238* (2013.01)

(58) Field of Classification Search
CPC ........ G05B 19/042; G05B 2219/23238; D06F 33/00; D06F 2210/00; D06F 2212/00; A47L 15/0063; A47L 15/46; G06K 7/1417

See application file for complete search history.

(56) References Cited

U.S. PATENT DOCUMENTS

| | | |
|---|---|---|
| 9,383,746 B2 | 7/2016 | Ha et al. |
| 9,631,311 B2 | 4/2017 | Ha et al. |

(Continued)

FOREIGN PATENT DOCUMENTS

| | | |
|---|---|---|
| CN | 1749466 A | 3/2006 |
| CN | 102801577 A | 11/2012 |

(Continued)

*Primary Examiner* — Ziaul Karim
(74) *Attorney, Agent, or Firm* — Laurence A. Greenberg; Werner H. Stemer; Ralph E. Locher

(57) ABSTRACT

A method for the process programming of a household appliance includes the following steps: receiving a sequential program by the household appliance; checking the sequential program with respect to a predetermined device condition by the household appliance; and releasing the sequence of the sequential program in the household appliance as a function of the result of the check.

12 Claims, 3 Drawing Sheets

(51) Int. Cl.
    *D06F 34/05*     (2020.01)
    *D06F 101/00*     (2020.01)
    *D06F 33/47*     (2020.01)

(56) References Cited

U.S. PATENT DOCUMENTS

| | | | | |
|---|---|---|---|---|
| 2007/0232332 | A1* | 10/2007 | Holur | H04L 65/1069 |
| | | | | 455/461 |
| 2009/0006970 | A1* | 1/2009 | Jeffery | D06F 34/05 |
| | | | | 715/733 |
| 2012/0090099 | A1 | 4/2012 | Kim et al. | |
| 2012/0303323 | A1* | 11/2012 | Ha | G05B 23/027 |
| | | | | 702/183 |
| 2017/0364048 | A1* | 12/2017 | Park | H04L 12/2818 |

FOREIGN PATENT DOCUMENTS

| | | | |
|---|---|---|---|
| CN | 104099751 | A | 10/2014 |
| CN | 104328623 | | 2/2015 |
| CN | 106319833 | A | 1/2017 |
| DE | 69318782 | T2 | 11/1998 |
| DE | 102010030016 | B4 | 4/2012 |
| DE | 102011077572 | A1 | 12/2012 |
| DE | 102012217004 | A1 | 3/2014 |
| DE | 102013218871 | A1 | 8/2014 |
| DE | 102014102531 | A1 | 9/2015 |
| EP | 2441871 | A2 | 4/2012 |
| EP | 2989940 | A1 | 3/2016 |
| JP | 2002273089 | | 9/2002 |
| JP | 2002273089 | A * | 9/2002 |
| WO | 2013021330 | A1 | 2/2013 |

* cited by examiner

CONTROL OF A HOUSEHOLD APPLIANCE

The invention relates to the control of a household appliance. In particular, the invention relates to the creation of a sequential program for a household appliance.

PRIOR ART

A household appliance such as a washing machine or a dishwasher is designed to carry out a support function in a household on the basis of a predetermined sequential program. The sequential program typically comprises a number of sections which are processed in succession. For instance, a cleaning program for a washing machine can comprise the steps pre-wash, soak, main wash and spin. One or more actuators of the household appliance can be controlled in each section, in the example of the washing machine, for instance a water valve, a drum drive or a liquor heater. The advance of the sequential program through individual sections or steps is generally dependent on conditions which can comprise an event or a predetermined time. A sequential program comprises all conditions and actuator controllers linked thereto in a predetermined sequential arrangement.

A predetermined number of sequential programs is typically provided in the household appliance and a contribution by the user, if he extends beyond the selection of the sequential program, is limited to a parameterization. For instance, a sequential program of the washing machine can be provided for washing colors and the sequential program can be introduced at liquor temperatures of 30°, 60° or 90°. The spinning of the sequential program can be parameterized by the user to a maximum rotational speed or a maximum time.

DE 69 318 782 T2 proposes establishing different variants of household appliances, by each variant being assigned a definition pattern which establishes an association between functions and elements of the household appliance.

DE 10 2010 030 016 B4 proposes a technique in order to facilitate a user with creating a new operating program for a household appliance.

Provision is generally not made, however, for a user to create a separate sequential program which then runs on the household appliance. An object which underlies the present invention therefore consists in providing an improved technique for the sequential programming of a household appliance.

DISCLOSURE OF THE INVENTION

A method for the sequential programming of a household appliance comprises steps for receiving a user-controlled sequential program by means of the household appliance; checking the sequential program for a predetermined appliance condition by means of the household appliance; and releasing the sequence of the sequential program in the household appliance as a function of the result of the check.

In this way, the execution of any sequential program on a household appliance can be enabled without compromising the safety of the household appliance. The sequential program can in particular be user-controlled, in other words a user of the household appliance may have the ability to create the sequential program or to amend an existing sequential program. Checking for the predetermined appliance condition can represent the framework within which a sequential program can operate freely. A violation of the framework conditions can be prevented by a sequential program, which violates a predetermined appliance condition, not being permitted for execution on the household appliance. The household appliance can then still be used with another sequential program, which is fixedly installed in the household appliance, for instance.

The development of the sequential program can therefore take place on another appliance to the household appliance. Control elements which are preferably available for development purposes, for instance an extended graphic or numerical display of parameters or an extended keypad for command inputs, therefore do not need to be retrofitted to the household appliance. The household appliance can therefore be produced cost-effectively, while the development of the operating program on another appliance can be carried out more efficiently.

General appliances which comprise a programmable sequential control and are provided for use in a private household are considered here to be household appliances. Household appliances are generally used in closed rooms and frequently serve for the cleaning or maintenance of objects of everyday use, for instance for cooking, refrigerating, rinsing or washing. In particular, a household appliance can comprise a dishwasher, a washing machine or an ironing machine.

The household appliance can be adjusted individually for instance by a user or a service provider by means of the sequential program. If a user of a dishwasher has special dishes, for instance, which he would like to clean (gold edge porcelain, uranium glass, silver cutlery etc), he can therefore develop an adjusted sequential program therefor or allow development of the same. A use of the household appliance for a special purpose can also be enabled such as for instance for cleaning chemical laboratory equipment or for removing drilling chips, milling chips or sawing chips from a metal workpiece.

In the proposed manner the household appliance can be prevented from being used in a manner which jeopardizes the operational safety of the household appliance, the safety of a person or an object in the region of the household appliance or the integrity of an object to be handled. An expected service life of the household appliance can remain unshortened. A product liability of a manufacturer of the household appliance can also be assumed when the received sequential program is executed.

In one embodiment the sequential program can be created by a third party. For instance, the household appliance can be adjusted, prior to delivery to a user, by an outfitter to a specific purpose, a product line, predetermined specifications (for instance with respect to a maximum energy consumption or of emissions). The outfitter can then market the adjusted household appliance under a separate name.

The appliance condition can relate in particular to an operating parameter of an actuator of the household appliance. In particular, the operating parameter can relate to the frequency of a single switching-on or off of the actuator, a maximum switch-on duration of the actuator, a property of a medium which can be influenced by means of the actuator. The property can comprise in particular a quantity, a temperature or a level of contamination. The sequential program can also be checked for a predetermined maximum elapsed time. Combinations are likewise possible, wherein the adherence to predetermined conditions can take place in a binary manner (using Boolean algebra) or in an analog manner by relating parameters. In the latter case, a formulaic condition can be set up, for instance, for instance $A+B<C$, wherein A and B are operating parameters and C is a threshold value. If the condition is not fulfilled, control over the actuator or the household appliance can be withdrawn from the sequential program. The adherence to a predetermined elapsed time can be carried out combined with or separately from the other appliance conditions. In particular, it is possible to prevent a process from being continued or repeated (endless loop) until an unreachable condition is met.

The actuator can comprise a motor or a heater, for instance. The operating parameter can ensure that a predetermined load of the actuator is present in order to avoid overloading the actuator. The motor can drive a laundry drum, for instance, and the load can consist in the laundry in the drum. The motor can also drive a pump and the load consists in a liquid to be circulated. If the actuator comprises a heater, the load can comprise an object to be heated, for instance a liquor or a laundry item. The operating parameter can ensure that the actuator is able to be operated within its specifications. It can be ensured, for instance, that an actuator embodied as a short-term rotor is not operated intermittently too frequently, for too long or too intensively. A maximum operating temperature, a maximum power consumption or another operating parameter can be met.

In one embodiment, the appliance condition is checked before the sequential program is executed. This variant is also called a static check and a sequential program which does not pass this check because it could violate an appliance condition during its execution is not permitted at all for execution on the household appliance.

In another variant, the appliance condition is checked during the execution of the sequential program. This variant can also be known as a dynamic check. Control over the household appliance can be withdrawn from the sequential program when the violation of an appliance condition is looming or is revealed during operation of the household appliance. The dynamic check can supplement the static check. On account of the dynamic check, a potentially hazardous state of the household appliance for one of its elements, a person or an object in the region of the household appliance or an object processed by means of the household appliance can be better avoided. In the event of the household appliance breaking down as a result of the dynamic check, a predetermined abort program can be carried out, in order to put the household appliance into a stable state. If necessary, a gentle end to treating the object can also be controlled. For instance, a liquor of a dishwasher can be pumped out in order to establish the safe state. Objects to be cleaned can be washed off using fresh water.

Method according to one of the preceding claims, wherein a parameter of the sequential program, which violates the appliance condition, is changed such that the appliance condition is fulfilled. If a liquor temperature of >100° is required for instance in a washing machine or dishwasher, the predetermined temperature can be lowered to 90° or 80° for instance. This adjustment can be carried out in the static or dynamic check. A user of the household appliance is preferably informed of the adjustment in order to avoid an unwanted behavior of the household appliance. In another embodiment, the parameter can also be left unchanged.

In one embodiment, the household appliance comprises a communication interface, which can be connected in particular to a network. The sequential program can then be loaded into the household appliance by way of the interface from a computer, a server or storage device which is connected to the network.

In another embodiment, the sequential program is transmitted optically. To this end the sequential program is present in an optically encoded form and an optical sensor is provided on the household appliance. The sensor can be attached to the household appliance with minimal cost, can be robust despite dirt or malfunctions, and is moreover easy to care for in terms of use or cleaning. A range of information to be transferred to the household appliance can be relatively small, for instance in the range of approx. 10 bytes to approx. 10 Kbytes, so that the optical transmission offers sufficient bandwidth for an acceptably rapid transmission. Larger quantities of information can be divided over a number of encodings. The sequential program can be encoded in particular in a binary manner, indeed either one-dimensionally, for instance in the manner of a bar code, or two-dimensionally, for instance in the manner of a QR code. The optical encoding can comprise an error protection or error correction in order to circumvent a transmission error of the sequential program. In a further embodiment of the invention, the optically encoded sequential program can also be received for instance by means of a mobile device, for instance a smartphone, and then transferred to the household appliance. This transfer is preferably carried out wirelessly, for instance via Bluetooth or WLAN.

In order to emit the sequential program, a mobile appliance with an optical output facility can in particular be used. Such an appliance can comprise a laptop or a smartphone, for instance. The appliance can be linked for data purposes with another appliance and can charge the sequential program from an external source. The appliance can also be used to create or develop the sequential program. Therefore, a program ("App") can be offered on the smartphone for the simple and intuitive adjustment of sequential parameters of a predetermined sequential program. The degree of influenceability of the sequential program can be predetermined at different stages. For instance, powerful programming concepts can be provided by means of constructs such as a specific loop pass (WHILE), a specific jump (IF-GOTO) or parameterized subprogram (CALL).

A control apparatus for a household appliance comprises an interface for receiving a sequential program; a processing facility which is designed to check the sequential program for a predetermined appliance condition; and the sequence of the sequential program by the household appliance as a function of the result of the check. For the check, only a modest processing outlay can be necessary, so that a typical processing facility can be used to control the household appliance. Moreover, it may be acceptable for the check to require a number of seconds.

The control apparatus can be designed to execute at least one part of the afore-described method. To this end it is preferred that the control apparatus comprise a processing facility, which can be formed in particular by a programmable microcomputer or microcontroller. Features or advantages which are cited with respect to the control apparatus can also be related to the method and vice versa.

BRIEF DESCRIPTION OF THE FIGURES

The invention is now described more precisely below with reference to the appending figures, in which.

DETAILED DESCRIPTION OF EXEMPLARY EMBODIMENTS

Figure 1:
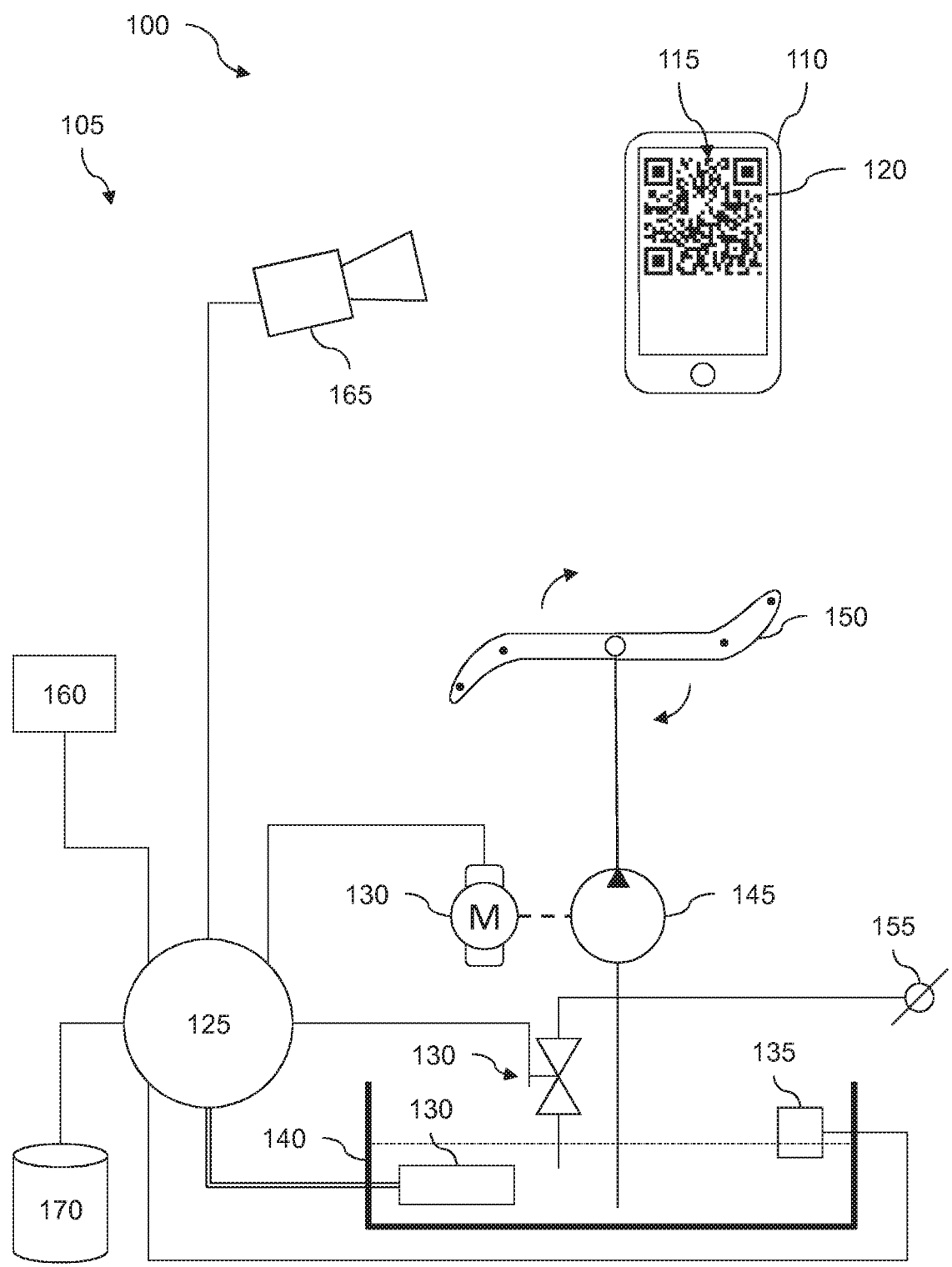
FIG. 1 shows a system with a sequence-programmable household appliance.

FIG. 1 shows a system 100, which comprises a sequence-programmable household appliance 105 and an appliance 110. The household appliance 105 comprises a dishwasher, purely by way of example here, any other household appliance 105 could also be used, however. The household appliance 105 can be controlled using a sequential program 115. The appliance 110 preferably comprises a mobile appliance, which comprises at least one optical output facility 120. The output facility 120 is further preferably designed to indicate the sequential program 115 in an optically encoded manner. To this end, the output facility 120 is preferably embodied to be two-dimensional. The output facility 120 can have a predetermined contrast ratio (e.g. >20:1) and further optionally be embodied with background lighting.

The household appliance 105 is shown schematically and in a very simplified form. It comprises a control apparatus 125, which is designed to execute the sequential program 115, at least one actuator 130 and typically at least one sensor 135. In the embodiment shown as a dishwasher, the household appliance 105 comprises purely by way of example a water container 140, from which water can be pumped by means of a water pump 145 into a rotatable spray arm 150, which can spray the water onto the dishes. The water can then drip into the water container 140. In the embodiment shown, a first actuator 130 is provided as a pump motor for driving the water pump 145, a second actuator 130 as a controllable water value between a water inlet 155 and the water container 140, and a third actuator 130 as a heater for water in the water container 140. The sensor 135 can comprise a fill level or temperature sensor, for instance. A timer can also be included as a sensor 135. The household appliance 105 optionally comprises a control element 160, which can comprise input and/or output elements for an operator.

The actuators 130 are activated and deactivated in a predetermined sequential arrangement by means of the sequential program 115. Each activation or deactivation can be based on a parameter which can be scanned by means of a sensor 135, for instance. Specifications for parameters can also be scanned by the control element 160. For instance, the water valve 130 can be opened until a water level scanned by the sensor 135 reaches a predetermined threshold value. The heater 130 can then be switched on until the temperature of the water in the water container 140 has reached a predetermined temperature, according to the sensor 135. This predetermined temperature can be scanned by the control element 160. A current strength flowing through the heater 130 can be adjusted as a function of the temperature of the water in the water container 140 in order to enable a rapid heating, but at the same to avoid as effectively as possible an overload of the heater 130. The actual cleaning process of the dishes can be started by activating the pump motor 130.

It is proposed to enable the transmission of a sequential program 115 from an external source into the household appliance 105 and to allow the execution of the sequential program 115 by the control apparatus 125 if the received sequential program 115 fulfills predetermined appliance conditions. The appliance conditions can be predetermined by the design of the household appliance 105 or by a predetermined restriction and are preferably selected such that an overload, a malfunction or an excessive wear on the household appliance 105 or one of its elements are avoided.

The transmission can take place in different ways; in the preferred embodiment shown an optical interface 165 is provided, in order to be able to scan the optically encoded sequential program 115 from the appliance 110 or another source. The optical interface 165 can comprise a camera with a line sensor or a surface sensor, in order to be able to scan the two or three-dimensionally encoded sequential program 115. In another variant, a laser-controlled optical code sensor can be provided. In a particularly preferred embodiment, the sequential program 115 is present in encoded form as a QR code, wherein dependent on the data volume to be transmitted, quality of the optical interface 165 and intended robustness of the transmission, different, known encodings can be used. The encoding can comprise control bits for error recognition and in a further embodiment also correction bits for correcting transmission errors. After receipt, the sequential program 115 can be stored in a storage device 115. A user of the household appliance 105 can select the received or another sequential program 105 by means of the control element 160 and possibly parameterize the same in order to use the household appliance 105.

After its receipt by the household appliance 105, the sequential program 115 is preferably subjected to the check for adherence to appliance conditions, so that the check is carried out within the household appliance 105 and a manipulation of the checking method is largely ruled out. The check can comprise the adherence to predetermined appliance conditions, for instance. An appliance condition can provide that a parameter which can be determined on the household appliance 105 during the sequence of the sequential program 115 lies above or below a predetermined threshold value or within a predetermined range.

Such a parameter can be used directly to control the sequence of the household appliance 105, for instance a water temperature in the water container 140. A less obvious parameter can also be tested, for instance the adherence to a maximum current consumption of the entire household appliance 105. Another parameter can again relate to an expected wear of a component of the household appliance 105 and be determined for instance on the basis of a switching frequency of an element or a historical temperature curve. A parameter can also be determined algorithmically on the basis of a number of sensor values or actuator activations. For instance, an emission of an aggressive substance from the described cleaning process can be determined on account of a water quantity, a dirt and an adding of detergent. Not all parameters which are checked as an appliance condition have to be disclosed. Certain appliance conditions can be so complex to formulate that only one general recommendation can be specified to a creator or processor of the sequential program 115, in order for instance not to allow an emission or a current consumption to get too large. Indications as to how such recommendations are to be met can likewise be provided.

It is preferable if the control apparatus 125 which is designed to control the household appliance 105 also undertakes the check of the sequential program 115. In another embodiment, a dedicated control apparatus 125 can also be provided for the check.

Figure 2:
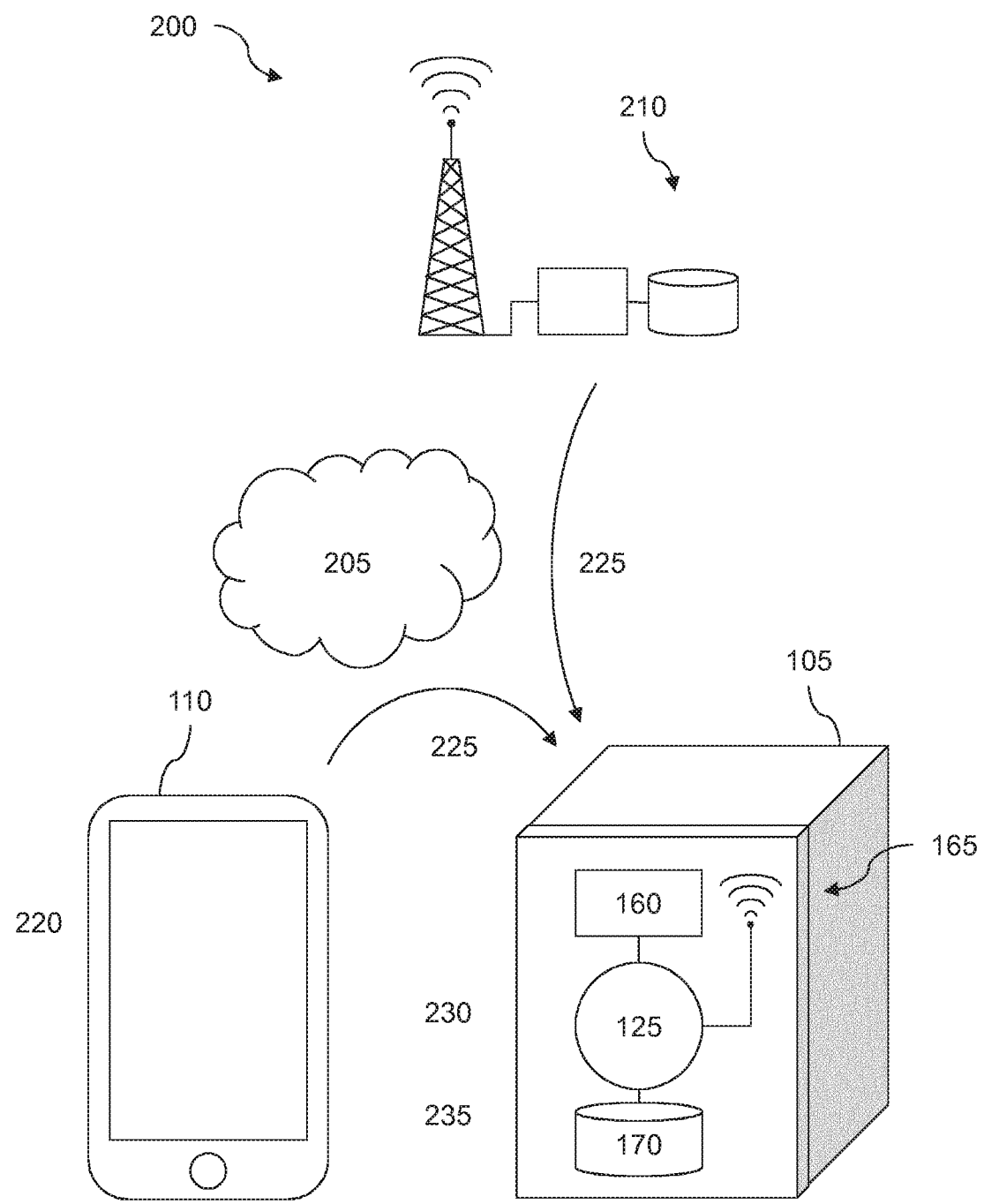
FIG. 2 shows an illustration of a method.

FIG. 2 shows a clarification of a method 200 for controlling a household appliance 105 and the dishwasher 105 in FIG. 1. Here a household appliance 105 according to one of the embodiments mentioned above with respect to FIG. 1 is preferred. Furthermore, an appliance 110 according to FIG. 1 can be used. Optionally, a communication network 205 or a central component 210 can also be used for the method 200. The communication network 205 can be designed wholly or partially to be wireless or also wired. Communication network 205 can also form part of the Internet. The central component 210 can in particular comprise a sensor or a similar central service. The component 210 can be anonymized by the communication network 205 so that a physical aspect of the component 210 such as its place of installation may be insignificant for the use of a service offered or effected thereby ("cloud server"). In one embodiment the component 210 is designed to produce a communication link with one or more household appliances 105 in a household. Such a component is known under the term "Home Connect Server" by Bosch Siemens Home Appliances (BSH).

In an optional step 220, the sequential program 115 is created on the appliance 110 or an already existing sequential program 115 is processed. In one embodiment, a program ("App") installed locally on the appliance 110 is used for this purpose and the edited sequential program 115 can be stored locally on the appliance 110. In another embodiment, the manipulation program can also run on the central component 210 and be controlled by means of the appliance 110 ("web app"). The edited sequential program 115 can be stored on the central component. The editing can comprise an input, a compilation of the input or the use of one or more parameters.

Each of these partial results can optionally be validated. During validation, a check can be carried out locally, in other words outside of the household appliance 105, to determine whether the sequential program 115 adheres to predetermined limits. In particular, the adherence to appliance limits of a known household appliance 105 can be checked. The validation can take place within the scope of editing the sequential program or prior to transfer to the household appliance 105. Here the validation can take place in different variants of the method 200, for instance by the appliance 110 or by the component 210. If the validation fails, a transfer of the sequential program 115 is preferably prevented.

In one embodiment, the sequential program 115 comprises edited parameters, in another embodiment a parameter list is provided separately from the sequential program 115. Parameters which are controlled by a user of the household appliance 105 can be checked by the sequential program 115 or added to the parameter list.

The sequential program 115 can then be transferred to the household appliance 105 in one step 225. In the embodiment in FIG. 1, a local interface, which is designed for an optical transfer, is used for this purpose. In another embodiment, the local interface can also be embodied for instance wirelessly in accordance with the WLAN or Bluetooth standard. Other local interfaces, for instance wired, using RS232 or USB, are likewise possible. The transfer can also use the communication network 205. This route is then particularly preferred if the provided sequential program 115 is present on the central component 210. The transmission can optionally be initiated by the household appliance 105 or the transmitting appliance 110, 210.

In a step 230, the received sequential program 115 is checked by the household appliance 105 for adherence to a predetermined appliance condition. To this end, parameters which are used in the sequential program 115 or are attached thereto are checked to determine whether they lie within predetermined ranges. Further parameters, intermediate results, boundary conditions or primary goals can likewise be checked, as described in more detail above. If a test fails, an appliance condition is therefore not fulfilled, and the execution of the sequential program 115 can therefore be prevented. On the other hand, if all predetermined appliance conditions are fulfilled, the execution of the sequential program 115 can be released in a step 235.

Alternatively or in addition to blocking, the sequential program 115 or a parameter for the sequential program 115 can be automatically adjusted such that all appliance conditions can be fulfilled. A corresponding notification to a user is preferred, in this regard. The amended sequential program 115 can then be stored in the storage device 170 for subsequent use. If the appliance condition is checked while the sequential program 115 is being carried out, a "graceful exit" from the sequential program 115 can therefore be controlled.

Figure 3:
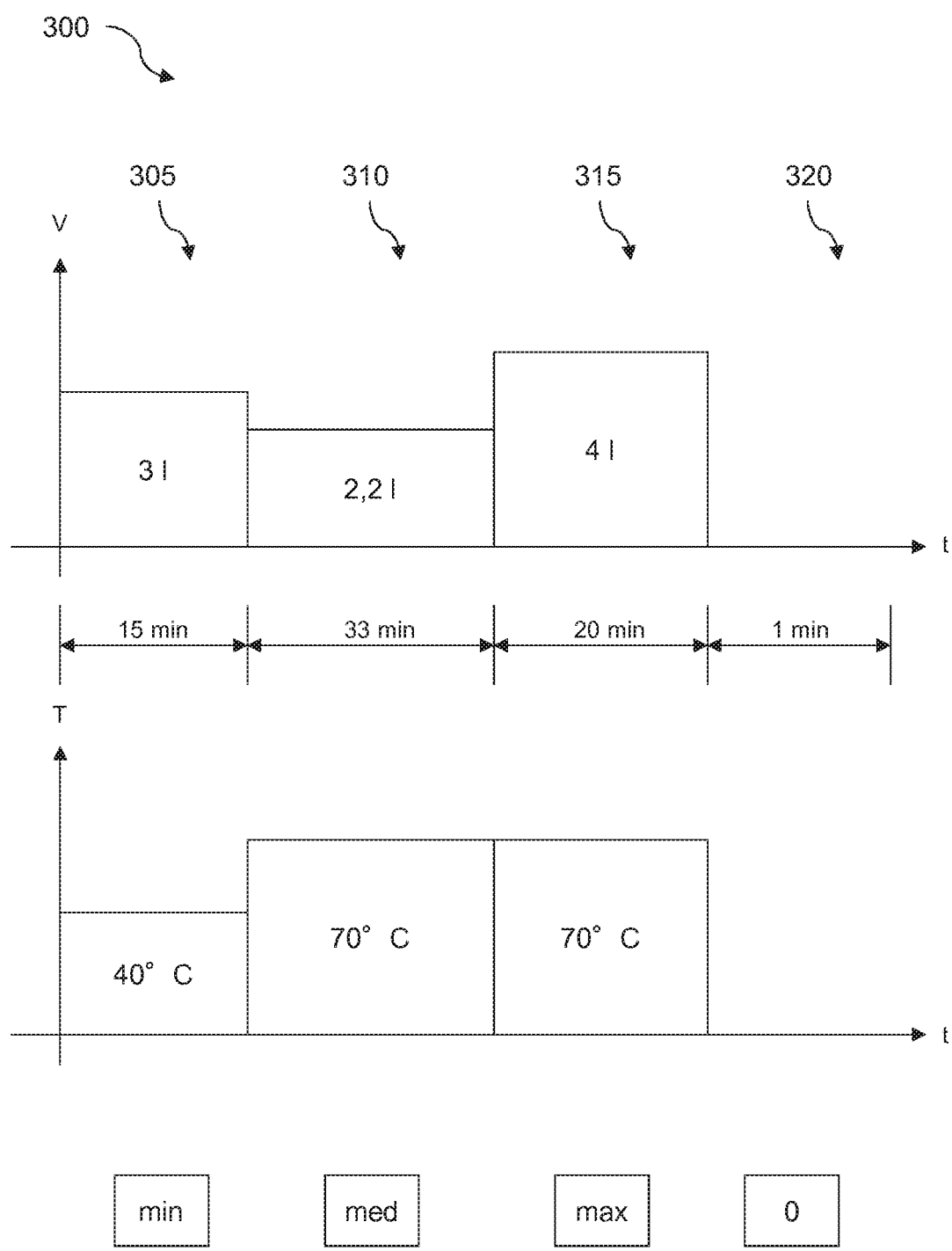
FIG. 3 shows a sequential program for a household appliance.

FIG. 3 shows an exemplary sequential program 115 for a household appliance 105, in the example of the dishwasher 105 in FIG. 1. A graphic display of the temporal course of various exemplary parameters of the household appliance 105 is shown. Shown in an upper region is a desired course of a water quantity in the water container 140, in a central region a desired course of a temperature of the water in the water container 140. The time is plotted in the horizontal direction in each instance. The sequential program 115 here comprises, by way of example, four temporally consecutive phases 305, 310, 315 and 320. In a lower region, an energy requirement for the respective phase 305-320 is shown.

A program for changing the sequential program 115 can allow, for instance, the temporal duration of one of the phases 305-320 or its sequence to be changed. Further possibilities of influence may comprise the increasing or reducing of the water level or the temperature of the water in the water container 140 in one of phases 305-320. The display of the energy consumption can assist in interactively changing the sequential program 115 so that the energy consumption is minimized. Instead of the energy consumption, one or more further parameters can also be shown, for instance a sound development, wear of the household appliance 105 or how gentle or aggressive the sequence of the sequential program 115 is for an object to be treated.

REFERENCE CHARACTERS 100 system
105 household appliance, e.g. dishwasher
110 appliance
115 sequential program
120 optical output facility
125 control apparatus
130 actuator
135 sensor
140 water container
145 water pump
150 spray arm
155 water inlet
160 control element
165 optical interface
170 storage device
200 method
205 communication network
210 central component
220 create sequential program
225 upload communication program
230 check
235 release
305 first phase
310 second phase
315 third phase
320 fourth phase

The invention claimed is:

1. A method for the sequential programming of a household appliance by a user, the method comprising the following steps:
receiving a sequential program by the household appliance from a user;

checking the sequential program for adherence to at least one known appliance limit for the household appliance;

executing a sequence of the sequential program in the household appliance if the checked sequential program adheres to the known appliance limit for the household appliance;

if the checked sequential program violates the known appliance limit for the household appliance, either:
preventing execution of the sequence of the sequential program in the household appliance; or
changing a parameter of the sequential program that violates the known appliance limit, so that the known appliance limit for the household appliance is adhered to;

after changing the parameter of the sequential program, automatically executing the sequence of the sequential program in the household appliance to program the household appliance;

wherein said sequential program is a user-controlled sequential program created or amended by the user.

2. The method according to claim 1, wherein the known appliance limit relates to an operating parameter of an actuator of the household appliance.

3. The method according to claim 2, wherein the operating parameter relates to the frequency of a switching-on or a switching-off of the actuator.

4. The method according to claim 2, wherein the operating parameter relates to a maximum switch-on duration of the actuator.

5. The method according to claim 2, wherein the operating parameter relates to a property of a medium that may be controlled by way of the actuator.

6. The method according to claim 1, which comprises also checking the sequential program for a predetermined maximum elapsed time.

7. The method according to claim 1, which comprises checking the appliance limit during an execution of the sequential program.

8. The method according to claim 1, wherein, if the known appliance limit for the household appliance is violated, the parameter of the sequential program that violates the known appliance limit is changed, such that the known appliance limit is adhered to.

9. The method according to claim 1, wherein the receiving step comprises receiving the sequential program in an optically encoded form.

10. A control apparatus for a household appliance, the control apparatus comprising:
an interface configured for receiving a sequential program with a program sequence, said interface accessible by a user and configured to receive said sequential program from the user;
a processor configured to check the sequential program for adherence to at least one known appliance limit for the household appliance and, if the known appliance limit is adhered to, to execute the program sequence of the sequential program in the household appliance;
said processor further configured so that, if the known appliance limit is violated, said processor either:
does not permit execution of the sequence of the sequential program in the household appliance; or
changes a parameter of the sequential program that violates the known appliance limit, so that the known appliance limit for the household appliance is adhered to;
said processor further configured to, after changing the parameter of the sequential program, automatically execute the sequence of the sequential program in the household appliance to program the household appliance;
wherein said sequential program is a user-controlled sequential program created or amended by the user.

11. The control apparatus according to claim 10, wherein said interface is an optical interface.

12. The control apparatus according to claim 11, wherein said interface is configured for scanning a two-dimensional quick response (QR) code.

* * * * *